United States Patent
Quan et al.

(10) Patent No.: US 8,432,682 B2
(45) Date of Patent: Apr. 30, 2013

(54) ELECTRONIC DEVICE WITH SLOT COVER EJECTION MECHANISM

(75) Inventors: Tong-You Quan, Shenzhen (CN); Qing Dai, Shenzhen (CN); Kun-Chih Hsieh, New Taipei (TW); Chia-Min Wang, New Taipei (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 79 days.

(21) Appl. No.: 13/244,608

(22) Filed: Sep. 25, 2011

(65) Prior Publication Data

US 2013/0044412 A1    Feb. 21, 2013

(30) Foreign Application Priority Data

Aug. 18, 2011    (CN) .......................... 2011 1 0237677

(51) Int. Cl.
*G06F 1/16* (2006.01)
*H05K 5/00* (2006.01)
*H05K 7/00* (2006.01)

(52) U.S. Cl.
USPC ...................................... 361/679.38

(58) Field of Classification Search ........................ None
See application file for complete search history.

(56) References Cited

U.S. PATENT DOCUMENTS

| | | | | |
|---|---|---|---|---|
| 5,825,616 A * | 10/1998 | Howell et al. | ............ | 361/679.38 |
| 7,363,634 B2 * | 4/2008 | Lin | ............................... | 720/610 |
| 7,793,312 B2 * | 9/2010 | Yang | ............................. | 720/610 |
| 7,889,493 B2 * | 2/2011 | Lee | ............................... | 361/679.4 |
| 2003/0002270 A1 * | 1/2003 | Kitadai | .......................... | 361/807 |
| 2006/0274511 A1 * | 12/2006 | Choi | ............................. | 361/754 |
| 2008/0239658 A1 * | 10/2008 | Chou et al. | .................... | 361/686 |
| 2008/0266781 A1 * | 10/2008 | Olesiewicz et al. | ........... | 361/685 |
| 2009/0244861 A1 * | 10/2009 | Lee et al. | ........................ | 361/752 |
| 2010/0091444 A1 * | 4/2010 | Reid et al. | .................. | 361/679.37 |
| 2010/0142141 A1 * | 6/2010 | Tseng | ....................... | 361/679.38 |
| 2010/0208423 A1 * | 8/2010 | Lai | ............................ | 361/679.38 |

* cited by examiner

*Primary Examiner* — Lisa Lea Edmonds
*Assistant Examiner* — Xanthia C Cunningham
(74) *Attorney, Agent, or Firm* — Altis Law Group, Inc.

(57) ABSTRACT

An electronic device includes a housing defining a slot, a card socket, a slot cover moveably received in the slot, and an elastic piece. The card socket is capable of ejecting an electronic card out when pressed. The cover defines a through hole and an elastic hook engaging the slot to retain the cover in the slot. The elastic piece includes a base facing the first through hole, and a pair of arms connected to opposite ends of the base and abutting against the cover. The elastic piece is urged to be deformed to push the cover when the base is pushed by an object passing through the through hole, causing the hook to disengage from the slot. Then the base pushes the card to move inwardly, causing the card socket to push the card and the cover to move out of the slot in union.

7 Claims, 5 Drawing Sheets

ELECTRONIC DEVICE WITH SLOT COVER EJECTION MECHANISM

BACKGROUND

1. Technical Field

The present disclosure relates to electronic devices, and particularly, to an electronic device with a slot cover ejection mechanism.

2. Description of the Related Art

Electronic devices such as cell phones usually operate with an electronic card, such as subscriber identity module (SIM) card. The SIM card is enclosed in the electronic device so a user has to open a back cover of the electronic device when attempting to take out the SIM card, which is inconvenient.

Therefore, there is room for improvement within the art.

BRIEF DESCRIPTION OF THE DRAWINGS

The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
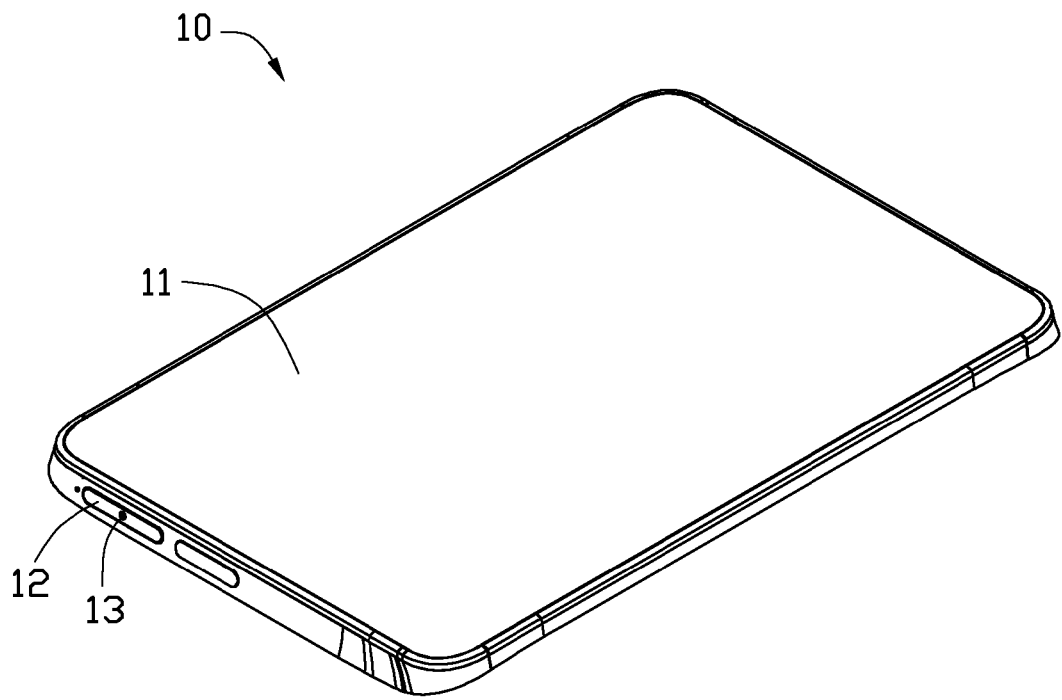
FIG. 1 is an assembled view of an electronic device in accordance with an exemplary embodiment.
Figure 2:
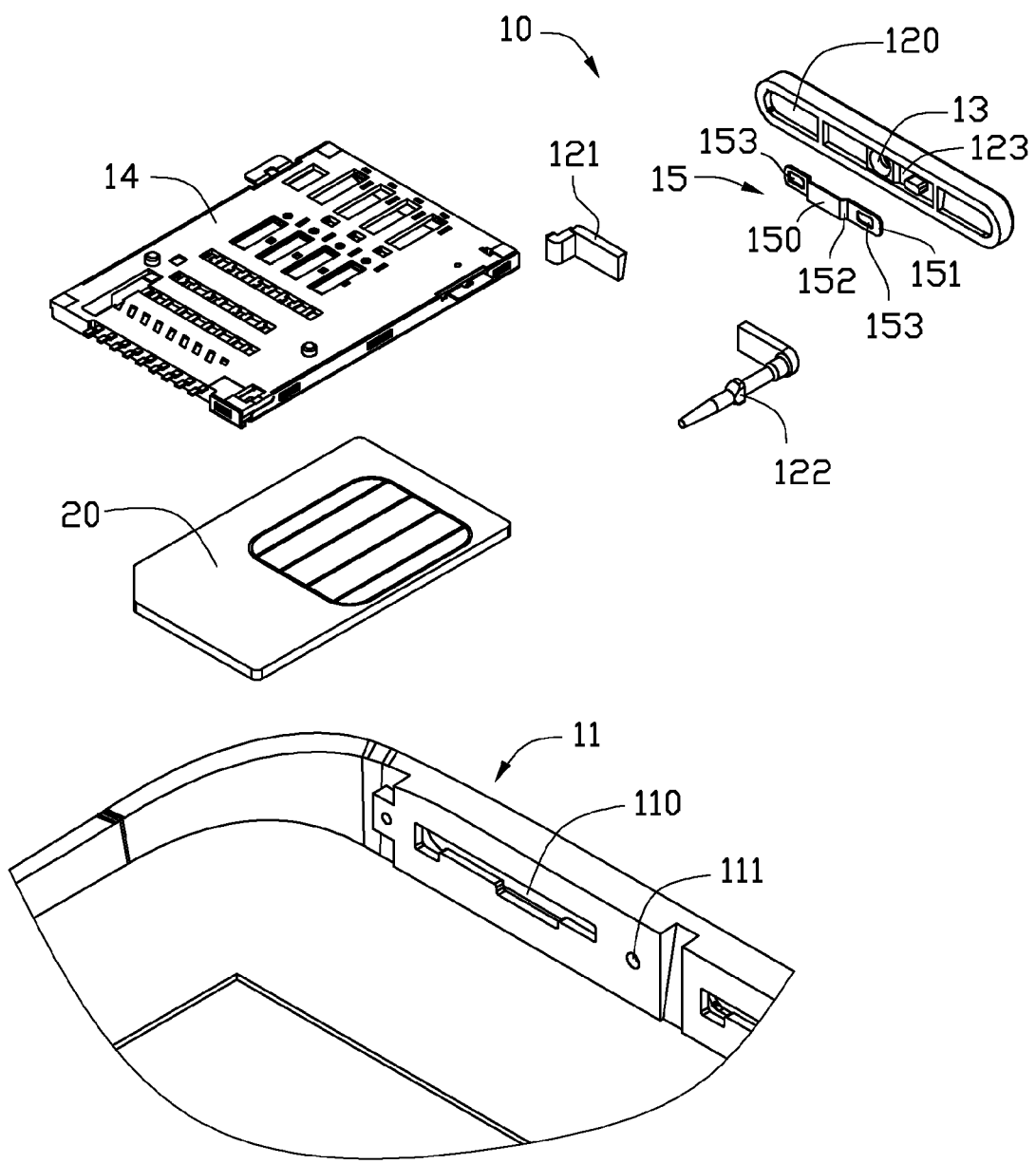
FIG. 2 is an isometric exploded view of the electronic device in FIG. 1.
Figure 3:
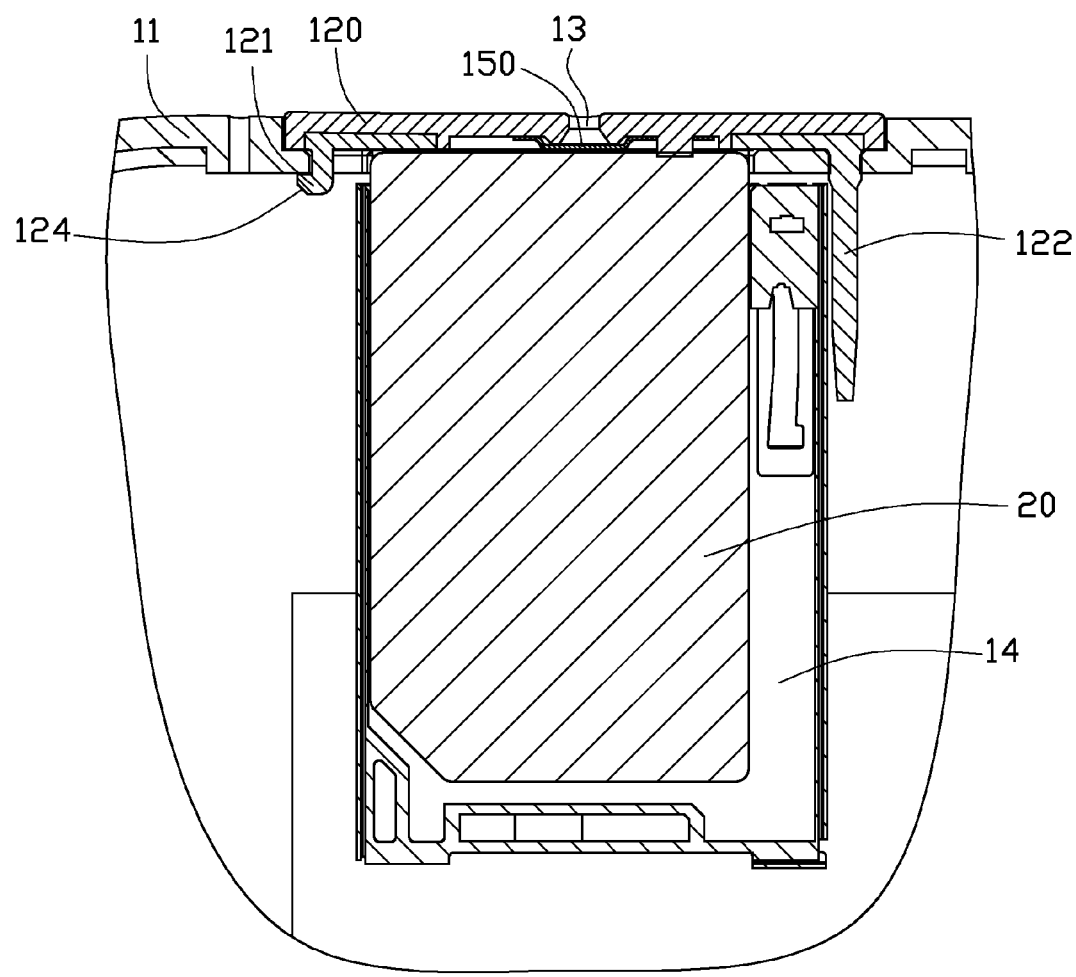
FIG. 3 is a cross-sectional view of the electronic device in FIG. 1 when a cover is retained in an opening.

Referring to FIGS. 1-3, an electronic device 10 includes a housing 11 and a slot cover 12. The housing 11 is mounted between an upper housing (not shown) and a lower housing (not shown) of the electronic device 10, and used to support elements (not shown) of the electronic device 10. A first through hole 13 is defined in the cover 12, and a slot 110 is defined in a side of the housing 11. The slot 110 can receive the cover 12. An electronic card socket 14 is arranged within the housing 11 and electrically connected to a circuit board (not shown) and aligned with the slot 110, and is used to receive an electronic card 20, such as a flash memory card or a subscriber identity module (SIM) card. The cover 12 covers the slot 110. The card socket includes a conventional ejection mechanism (not shown) for ejecting the electronic card 20 out when the electronic card 20 is pressed.

The cover 12 includes a main body 120, an elastic hook 121 and a positioning post 122 both protruding from the main body 120. In the embodiment, the first through hole 13 is defined in the center of the main body 120. The hook 120 and the positioning post 121 are located at two opposite ends of the main body 120. The hook 121 engages the inner edge of the slot 110 when the cover 12 is retained in the slot 110, thereby limiting the movement of the cover 12. The positioning post 121 is moveably received in a through hole 111 defined in the housing 11.

The electronic device 10 further includes an elastic piece 15. The elastic piece 15 includes a base 150 and a pair of arms 151. The base 150 abuts against the end of the electronic card, and the pair of arms 151 abuts against the inner surface of the main body 120 of the cover 12. The main surface of each arm 151 is substantially parallel to the base 150. The elastic piece 15 further includes a pair of connecting portions 152. The connecting portions 152 are obliquely connected between the base 150 and the arms 151. Two engaging holes 153 are respectively defined in the pair of arms 151. The main body 120 includes two positioning posts 123 protruding from its inner surface. Each positioning post 123 is inserted into one of the engaging holes 153 to fix the elastic piece 15 to the main body 120.

Figure 4:
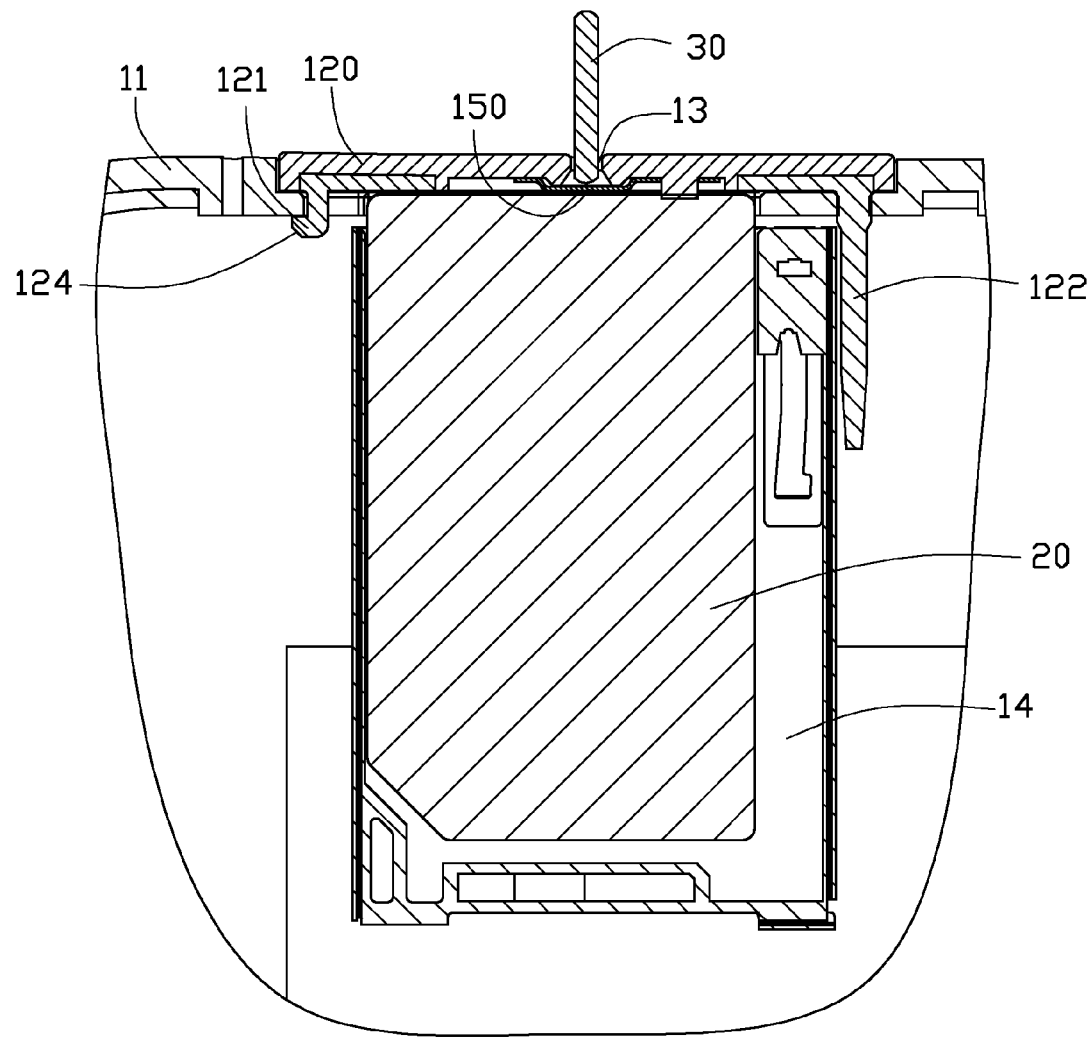
FIG. 4 is a cross-sectional view of the electronic device in FIG. 1 when a thin pin is inserted into the opening.
Figure 5:
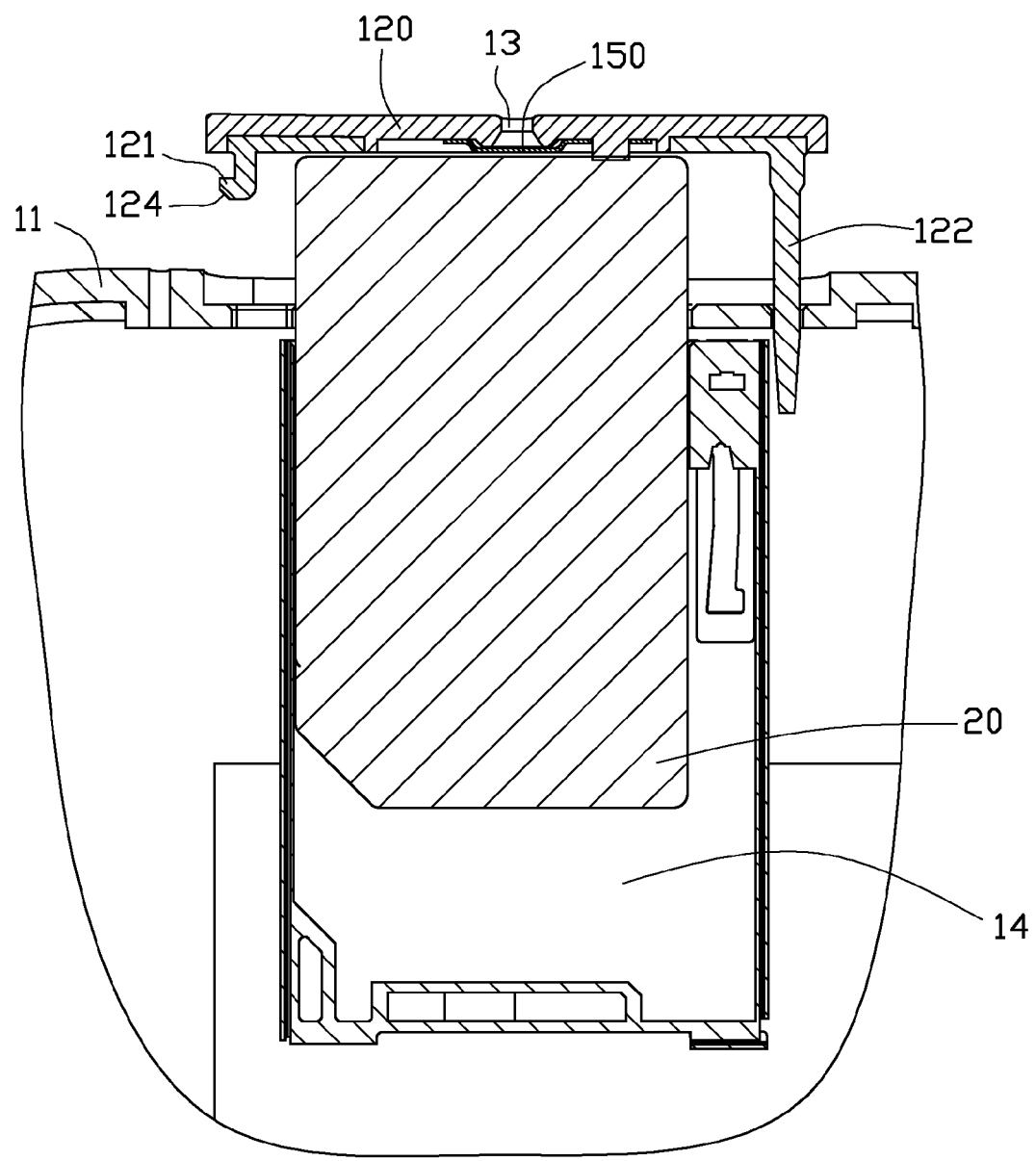
FIG. 5 is a cross-sectional view of the electronic device in FIG. 1 when the cover is pushed into the opening.

Referring to FIGS. 4 and 5, when needed, a thin pin 30 can be inserted into the through hole 13 to push the base 150 of the elastic piece 15. The base 150 is then urged to be elastically deformed, causing the pair of arms 151 to push the main body 120 and causing the middle of the main body 120 to be deflected outwardly, thereby enable the elastic hook 120 to disengage from the edge of the slot 110. The main body 120 of the cover 12 thus becomes free from the limitation of the engagement of the hook 120 with the slot 110. The cover 12 can then move out of the slot 110.

The base 150 is pushed by the thin pin 30 and can depress the electronic card 40 to move inwardly to actuate the conventional ejection mechanism of the card socket 14. After the thin pin 30 is withdrawn, the conventional ejection mechanism then ejects the electronic card 20 out from the slot 110. The electronic card 20 then pushes the cover 12 to move outward.

In the embodiment, the positioning post 122 is made of elastic material. When moving out of the slot 110, the main body 120 can be turned over to show the electronic card 20 positioned in the card socket 14. In an alternative embodiment, the positioning post 122 may be made of rigid material. The cover 12 can be pulled out of the through hole 111 to disengage from the housing 11, until free from the limitation of the slot 110, allowing the electronic card 20 in the card socket 14 to be exposed.

When the electronic card 20 has been removed or inserted into the card socket 14 again, a user can push the main body 120 into the slot 110. In the embodiment, the hook 120 includes an inclined plane 124 at the free end of the hook 120. When the cover 12 is pushed into the slot 110 it causes the hook to be deflected by the inclined plane 124 resisting against the edge of the slot 110. After the end of the hook 120 moves over the inner side of the slot 110, the hook 120 rebounds to engage the inner edge of the slot 110. Thus, the cover 12 can be retained in the slot 110.

It is understood that the present disclosure may be embodied in other forms without departing from the spirit thereof. Thus, the present examples and embodiments are to be considered in all respects as illustrative and not restrictive, and the disclosure is not to be limited to the details given herein.

What is claimed is:

1. An electronic device comprising:
   a housing defining a slot;
   a card socket arranged within the housing and aligned with the slot, the card socket configured to receive an electronic card, and eject the electronic card out when the electronic card is pressed;
   a slot cover detachably received in the slot, the slot cover comprising an elastic hook and a first through hole, the elastic hook configured to engage with an edge of the slot, thereby retaining the slot cover in the slot;
   an elastic piece comprising a base for abutting against an end of the electronic card, and a pair of arms connected to opposite ends of the base and abutting against the inner surface of the slot cover, the base aligned with the first through hole; and wherein the first through hole is configured for allowing an elongated object to pass therethrough to deform the elastic piece, causing the pair of arms to push the slot cover, the slot cover to be outwardly curved, thereby enable the elastic hook to disengage from the edge of the slot, the base depressing the electronic card to move inwardly, thus causing the card socket to eject the electronic card out from the slot.

2. The electronic device as recited in claim 1, wherein the slot cover further comprises a main body and a positioning post protruding from the main body, the housing comprises a through hole with the positioning post movably extending therethrough.

3. The electronic device as recited in claim 2, wherein the positioning post is made of elastic material.

4. The electronic device as recited in claim 2, wherein the positioning post is made of rigid material.

5. The electronic device as recited in claim 1, wherein the main surface of each arm is substantially parallel to the base, the elastic piece further comprising a pair of connecting portions obliquely connected between the base and the arms.

6. The electronic device as recited in claim 1, wherein two engaging holes are respectively defined in the pair of arms, the slot cover includes two positioning posts inserted into the respective engaging holes to fix the elastic piece to the cover.

7. The electronic device as recited in claim 1, wherein the first through hole is defined in the center of the slot cover.

* * * * *